(12) United States Patent
Speckamp et al.

(10) Patent No.: US 8,341,926 B2
(45) Date of Patent: Jan. 1, 2013

(54) SELF-PROPELLED HARVESTING MACHINE WITH HYDROPNEUMATIC DAMPENING SYSTEM

(75) Inventors: Dirk Speckamp, Hamm (DE); Jan Philipp Behra, Guetersloh (DE); Heinrich Hermeler, Telgte (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/186,671

(22) Filed: Jul. 20, 2011

(65) Prior Publication Data

US 2012/0023881 A1  Feb. 2, 2012

(30) Foreign Application Priority Data

Jul. 30, 2010 (DE) .......................... 10 2010 036 756

(51) Int. Cl.
*A01D 41/14* (2006.01)
*A01D 46/08* (2006.01)
*A01D 75/28* (2006.01)

(52) U.S. Cl. ...................... 56/10.2 E; 180/9.5; 180/9.54

(58) Field of Classification Search ................ 280/86.5, 280/89.11, 89.13, 90, 93.512, 6.154, 124.129, 280/205, 211, DIG. 1; 188/268, 290, 322.13; 305/132, 120, 124; 180/9.5, 9.56, 9.54; 56/10.2 E
See application file for complete search history.

(56) References Cited

U.S. PATENT DOCUMENTS

| | | | | |
|---|---|---|---|---|
| 3,331,601 A * | 7/1967 | Riehl | .......................... | 267/64.19 |
| 3,343,889 A * | 9/1967 | Bexten | .......................... | 305/155 |
| 3,430,977 A * | 3/1969 | Riehl | .......................... | 267/64.16 |
| 3,774,708 A * | 11/1973 | Purcell et al. | .................. | 180/9.5 |
| 4,411,341 A * | 10/1983 | Schultz | .......................... | 188/310 |
| 4,877,222 A * | 10/1989 | Davis | .......................... | 267/64.13 |
| 4,916,632 A * | 4/1990 | Doi et al. | .......................... | 700/280 |
| 5,271,632 A * | 12/1993 | Glaser et al. | ................ | 280/6.154 |
| 5,316,381 A * | 5/1994 | Isaacson et al. | .............. | 305/145 |
| 5,340,205 A * | 8/1994 | Nagorcka | ...................... | 305/132 |
| 5,409,075 A * | 4/1995 | Nieman | .......................... | 180/9.5 |
| 5,503,238 A * | 4/1996 | Urbanek et al. | ............. | 180/9.54 |
| 5,566,773 A * | 10/1996 | Gersmann | ...................... | 180/9.5 |
| 5,577,761 A * | 11/1996 | Tabata | .................... | 280/124.13 |
| 5,620,194 A * | 4/1997 | Keeler et al. | ................. | 280/81.6 |
| 6,032,961 A * | 3/2000 | Pradel et al. | ............... | 280/5.514 |
| 6,176,496 B1 * | 1/2001 | Busch | ........................ | 280/6.157 |
| 6,293,570 B1 * | 9/2001 | Gottschalk et al. | ...... | 280/86.751 |
| 6,364,078 B1 * | 4/2002 | Parison et al. | ................ | 188/380 |
| 6,386,554 B1 * | 5/2002 | Weddle | ....................... | 280/6.154 |
| 6,513,797 B2 * | 2/2003 | Sawai | ........................ | 267/64.16 |
| 6,556,907 B1 * | 4/2003 | Sakai | ............................. | 701/37 |
| 6,607,256 B2 * | 8/2003 | Yoshida et al. | ............... | 305/132 |
| 6,650,985 B2 * | 11/2003 | Lin et al. | .......................... | 701/50 |
| 6,663,114 B2 * | 12/2003 | Lamela et al. | ............... | 280/6.15 |

(Continued)

FOREIGN PATENT DOCUMENTS

DE  10 2005 046 553  3/2007

*Primary Examiner* — Arpad Fabian-Kovacs
(74) *Attorney, Agent, or Firm* — Michael J. Striker

(57) ABSTRACT

A self-propelled harvesting machine has a lifting device for a front attachment and at least one crawler track assembly which is provided with a damping system, and which is formed by a crawler track disposed on an axle of the harvesting machine and on either side of the axle, and the height of the harvesting machine can be changed by varying the spring travel of the hydropneumatic damping system of the crawler track assembly.

7 Claims, 2 Drawing Sheets

U.S. PATENT DOCUMENTS

| | | | |
|---|---|---|---|
| 6,718,244 B2 * | 4/2004 | Lin et al. | 701/50 |
| 6,880,684 B1 * | 4/2005 | Evans et al. | 188/319.2 |
| 7,025,429 B2 * | 4/2006 | Yoshida et al. | 305/132 |
| 7,200,981 B2 * | 4/2007 | Heidjann et al. | 56/17.2 |
| 7,318,595 B2 * | 1/2008 | Lamela et al. | 280/124.157 |
| 7,478,688 B2 * | 1/2009 | Ki | 180/9.1 |
| 7,543,833 B2 * | 6/2009 | Lundmark | 280/124.13 |
| 7,748,724 B2 * | 7/2010 | Gottschalk | 280/86.5 |
| 2002/0033094 A1 * | 3/2002 | Sawai | 92/261 |
| 2008/0084111 A1 * | 4/2008 | Rainer | 305/124 |
| 2008/0223671 A1 * | 9/2008 | Gleu | 188/298 |
| 2010/0071969 A1 * | 3/2010 | Rainer | 180/9.5 |

* cited by examiner

SELF-PROPELLED HARVESTING MACHINE WITH HYDROPNEUMATIC DAMPENING SYSTEM

CROSS-REFERENCE TO RELATED APPLICATION

The invention described and claimed hereinbelow is also described in German Patent Application DE 10 2010 036 756.7 filed on Jul. 30, 2010. This German Patent Application, whose subject matter is incorporated here by reference, provides the basis for a claim of priority of invention under 35 U.S.C. 119(a)-(d).

BACKGROUND OF THE INVENTION

The invention relates to a self-propelled harvesting machine.

Document DE 10 2005 046 553 A1 makes known a crawler track assembly of the initially described type, which comprises a damping system for suppressing vibrations in the crawler track assembly caused by travel over uneven terrain, and for ensuring that vibrations are quickly dissipated.

The problem addressed by the invention is that of providing a self-propelled harvesting machine of the initially described type that can react—in different operating states and in a flexible manner—to irregularities in the ground over which the harvesting machine travels.

SUMMARY OF THE INVENTION

Accordingly, it is an object of the present invention to provide a self-propelled harvesting machine which soles the above-identified problem.

In keeping with this object, one feature of the present invention resides in that the height of the harvesting machine can be changed by varying the spring travel of the hydropneumatic damping system of the crawler track assembly. The resulting capability to change the height of the harvesting machine makes it possible to easily compensate for ground irregularities, thereby ensuring that the harvesting machine remains in the most suitable operating position in various operating states, such as in the harvesting operating state, during travel along paths that are bounded laterally by fences or the like and are narrower than the front attachment of the harvesting machine, or when raising or lowering the front attachment.

Preferably, the spring travel of the crawler tracks disposed on the axle can be changed independently of one another. As a result, inclinations that extend transversely to the longitudinal axis of the harvesting machine and that occur in the operating state of harvesting on a slope can be advantageously offset. Furthermore, permanently active variation of spring travel performed during harvesting machine travel ensures that any vibrations that are introduced into the harvesting machine can be compensated for. This is significant for very wide headers in particular, the natural weight of which can cause the harvesting machine to start oscillating about the longitudinal axis thereof during travel over uneven ground, which is undesired.

In particular, a sensor system provided on the harvesting machine, and a regulating and control device can detect an inclination of said harvesting machine relative to the ground, and, depending on the tilt thereof, can vary the spring travel of the crawler track by controlling actuators. Using the sensor system and the regulating and control device, the longitudinal and/or transverse inclination of the harvesting machine can be detected and evaluated, in order to compensate for the tilt of the harvesting machine during the various operating states by varying the spring travel of the crawler track.

Advantageously, the hydropneumatic crawler track assembly can be transferred to an outer final position depending on an operating state of the harvesting machine. The outer final position of the crawler track assembly is the position of the crawler track assembly that can be reached when the entire available spring travel of the hydropneumatic crawler track assembly is used to raise or lower the crawler track assembly.

In a preferred embodiment, the operating state can be a raising or lowering position of the harvesting machine, in which the front attachment can be raised or lowered by the lifting device. The operating state of the raising or lowering position characterizes the time period in which a front attachment of the harvesting machine is to be raised or lowered, which also includes orienting the harvesting machine for raising or lowering relative to the front attachment or a chassis on which the front attachment is mounted or accommodated. In both positions, it is advantageous that, when a front attachment is raised or lowered from or onto a chassis on which the front attachment is mounted or accommodated, such as a header trailer parked on uneven ground, the resulting shortfall of the limited clearance height can be compensated for. The limited clearance height, which results from the available swivel travel of the lifting device, is furthermore limited by the additional load which is in the form of the front attachment and is present in the lifting device, due to greater spring compression of the harvesting machine when the front attachment is lowered or raised. In order to compensate for this shortfall, when the final position of the lifting device is reached, the crawler track assembly is raised by the amount of the spring travel, i.e. is transferred to an outer final position, thereby raising the lifting device further and providing additional clearance height. The process of lifting off of or placement onto the chassis of the front attachment is thereby simplified. As an additional advantage, an existing lifting device requires no modification to attain additional clearance height for raising or lowering, in particular on uneven ground.

Conversely, lowering the crawler track assembly by the amount of available spring travel makes it easier to raise the header when lying directly on the ground. Lowering the lifting device to a minimal height above the ground can prevent the front attachment from being grasped in order to be coupled to the lifting device, since the angle of the lifting device relative to the front attachment is too acute. Thus, when the harvesting machine attempts to lift it, it is slid forward, and so another attempt must be made to lift the front attachment. Since the crawler track assembly can be lowered, the lifting device can be lowered such that the angle formed between the lifting device and the front attachment is less acute since the center of rotation has been shifted to the rear axle of the harvesting machine, thereby making it easier to lift off of the ground.

Moving the crawler track assembly into the outer final position for this purpose can be initiated automatically or manually by using an operating device disposed on the harvesting machine. The operating device can be activatable when an appropriate operating state occurs in the raising or lowering position of the harvesting machine.

For this purpose, when a final position of the lifting device is reached, the operating device activates an actuator system which automatically transfers the crawler track assembly into the outer final position thereof. This is advantageous for the process of raising and lowering the front attachment, and when passing by obstacles with the front attachment mounted on the harvesting machine, e.g. when the harvesting machine moves back and forth between two fields separated by fences or the like, and the passage between the fences is narrower than the width of the front attachment.

Alternatively, the crawler track assembly can be transferred into the outer end position by manually operating the operating device when a final position of the lifting device is reached. In this embodiment, an operator must use the operating device to activate the actuator system that transfers the crawler track assembly into the outer end position once the lifting device has reached the final position thereof.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
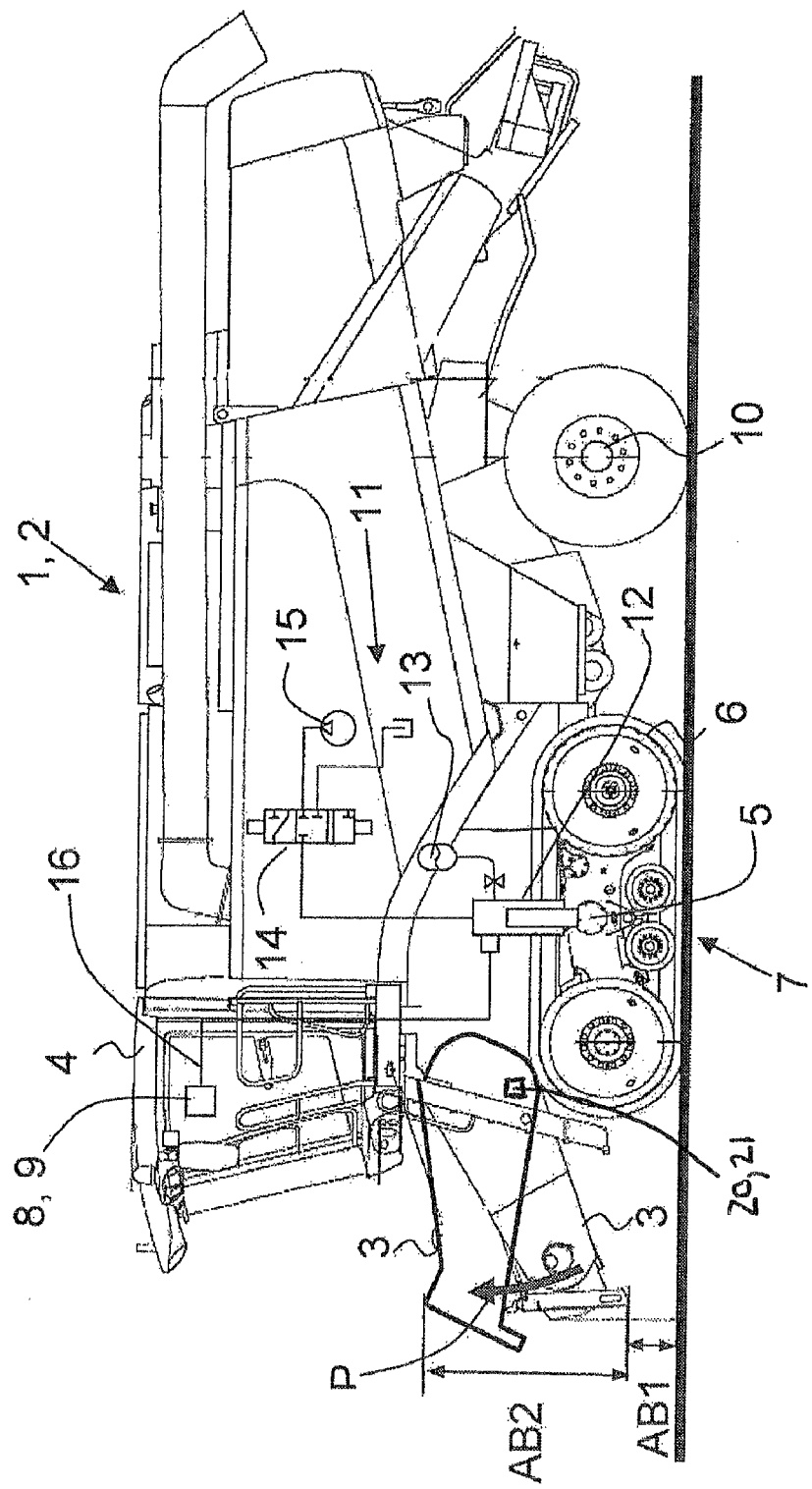
FIG. 1 shows a schematic depiction of a combine harvester comprising a crawler track assembly, in a side view.

FIG. 1 shows a self-propelled harvesting machine 1, in particular a combine harvester 2, comprising a lifting device 3 for raising a not-shown front attachment such as a header, a cab 4 located above the lifting device 3, and at least one crawler track assembly 7 formed by hydropneumatic crawler tracks 6 disposed on either side of a front axle 5 of combine harvester 2. A hydropneumatic dampening system 11 is coupled to each crawler track assembly 7, which are positioned on each side of front axle. 5. The hydropneumatic dampening system 11 comprises hydraulic suspension cylinders 12, which are connected with a hydraulic accumulator 13 and an adjustment valve 14, respectively, and a common pump 15 to pressurize the hydropneumatic dampening system 11.

As shown in FIG. 1, lifting device 3 can be displaced in arrow direction P from a first position—in which lifting device 3 is located for working purposes and has a first vertical height AB1 above the ground that can be changed during operation of a front attachment mounted on the lifting device 3—into a second position in which lifting device 3 is raising or lowering the front attachment and has a maximum vertical height AB2 above the ground. The swivelling of lifting device 3 is preferably accomplished using hydraulic cylinders which are supported on the frame of combine harvester 2 and on the underside of lifting device 3, in order to change the position thereof in the vertical direction.

The depiction in FIG. 1 also shows that the displacement travel of lifting device 3 in the vertical direction is limited by cab 4. This can make the process of raising or lowering the front attachment difficult in particular when ground irregularities are present when the front attachment is lifted off of or lowered onto a chassis on which the front attachment is mounted or accommodated, such as a header trailer, since the clearance height is limited and combine harvester 2 is also undergoing spring compression due to the additional load in the form of the front attachment, thereby further reducing the clearance height.

To avoid making structural modifications to lifting device 3 or cab 4 which limits the displacement travel, yet still increase the clearance height, the invention provides that the height of combine harvester 2 can be changed by varying the spring travel of hydropneumatic crawler track assembly 7. For that matter, FIG. 1 shows the crawler track assembly 7 in a first position, where the spring travel, which is adjustable by valve 14, and has a first value for dampening the crawler track assembly 7 in a desired manner during harvesting machine travel.

Figure 2:
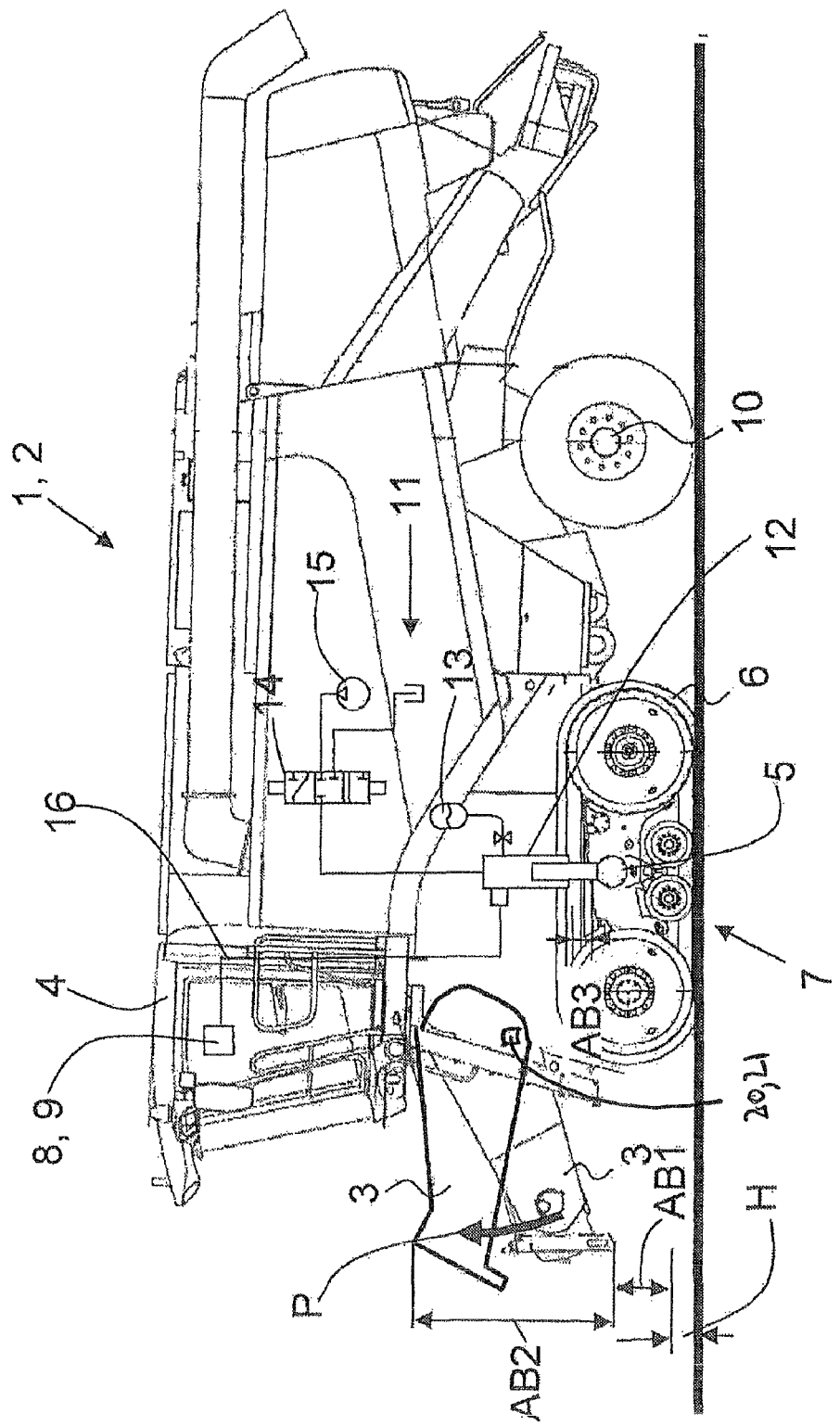
FIG. 2 shows a schematic depiction of the combine harvester according to FIG. 1, comprising a crawler track assembly that has been transferred to an outer end position.

FIG. 2 shows the combine harvester according to FIG. 1, in which crawler track assembly 7 has been transferred into an outer final position. The outer final position of crawler track assembly 7 is the position of crawler track assembly 7 that can be attained when the entire available spring travel of the hydropneumatic crawler track assembly is used to raise or lower crawler track assembly 7. In that case, crawler track assembly 2 is swivelled about a rotational point formed by rear axle 10, thereby adding additional distance H between lifting device 3 and the ground, which is added to first vertical distance AB1 or maximum vertical distance AB2. The clearance height of lifting device 3 therefore increases by additional height H, thereby making it easier to raise or lower a front attachment.

In FIG. 2, the crawler track assembly 7 is depicted in a final outer position. This final position is reached by raising the spring travel (AB3) of the hydraulic suspension cylinders of both crawler track assemblies 7. Hereto, the hydraulic pressure acting on the hydraulic cylinders 12 applied by pump 15 was increased. The adjustment is reached by controlling the pressurization of the hydropneumatic dampening system 11 by operating device 8. To do so, operating device 8 is connected to each of the valves 14 by a signal wire 16 to adjust the pressure in the hydropneumatic dampening system 11. Each valve 14 may be driven independently by the operating device 8. A sensor 20 for detecting the inclination of the harvesting machine, for example, a clinonmeter may be used to adjust the spring travel (AB3) of the hydropneumatic dampening system 11. Sensor 20 may be connected to the operating device 8 or the regulating and control device 9, cooperating therewith.

Swivelling about rear axle 10 by raising or lowering crawler track assembly 7 makes it possible—in particular when lifting a front attachment lying on the ground—to form an angle between the front side of lifting device 3, to which the front attachment is connected, and the front attachment which is lying on the ground, thereby simplifying the lifting of same since the angle is less acute than it would be if the height of crawler track assembly 7 were not regulated.

An operating device 8 is provided to transfer crawler track assembly 7 into the outer final position thereof in order to raise or lower the front attachment, and is preferably disposed in cab 4 and can be operated by an operator. An example of an operating device 8 is e.g. a regulating and control device 9, which is usually provided in combine harvesters 2 anyway, and which is connected to sensors located inside combine harvester 2 and is used to monitor and control the processes in combine harvester 2. A procedure can be integrated in said regulating and control device 9, which can be activated when a certain operating state occurs, such as in the raising or lowering position of combine harvester 2.

Operating device 8 is activated when a final position of lifting device 3 is reached. When activated, operating device 8 controls an actuator system that automatically transfers crawler track assembly 7 into the outer final position thereof. To prevent the case in which operating device 8 is accidentally triggered by lifting device 3 being raised to maximum height AB2 above the ground, this function can be turned on or off as needed, to ensure that it is available only in selected operating states.

For automatic operation, the movement of the lifting device 3 is observed. If the lifting device is raised and reaches a final upper position that is detected by a sensor 21, such as a rotary potentiometer arranged near a swivel axle of the lifting device 3, a corresponding signal is sent to the operating device 8. Sensor 21 is connected to the operating device 8. According to this signal, the operating device 8 generates a further signal that is sent to the hydropneumatic dampening system 11. Likewise, manual actuation can be provided by designing operating device 8 as a switch on control and regulating unit 9, or as a separate auxiliary switch which can be actuated by an operator as needed. The switch or auxiliary switch must be actuated in order to vary the height. For that matter, the operating device 8 could be part of the regulating and control device 9, which would therefore be used for controlling the whole harvesting machine or alternatively could be a separate operating device 8 mounted on the harvesting machine 1.

It will be understood that each of the elements described above, or two or more together, may also find a useful application in other types of constructions differing from the types described above.

While the invention has been illustrated and described as embodied in a self-propelled harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled harvesting machine, comprising
   an axle;
   a front attachment;
   a lifting device for a front attachment;
   a hydropneumatic dampering system;
   at least one crawler track assembly connected to the hydropneumatic dampering system and formed by a crawler track disposed on said axle and on either side of the axle,
   wherein the hydropneumatic dampering system controls an amount of spring travel of the crawler track and wherein a height of the harvesting machine varies by the amount of the spring travel, and
   wherein the spring travel of each respective trawler track is changeable independently using an operating device.

2. The harvesting machine as defined in claim 1, further comprising a sensor system and a regulating and control device detecting a tilt of the harvesting machine relative to a ground and, depending on an inclination, varying the spring travel of the hydropneumatic crawler tracks by activating actuators in the hydropneumatic dampening system.

3. The harvesting machine as defined in claim 1, wherein said hydropneumatic crawler track assembly is transferable into an outer final position depending on an operating state of the harvesting machine under control of the hydropneumatic damping system.

4. The harvesting machine as defined in claim 3, wherein in the operating state in which the harvesting machine is located in a raising or lowering position in which said front attachment is raiseable or lowerable by said lifting device, said crawler track assembly is situated in an outer final position under control of the hydropneumatic damping system.

5. The harvesting machine as defined in claim 4, further comprising an operating device connected to the hydropneumatic dampening system that provides control for moving the crawler track assembly into the outer final position initiated in a manner selected from the group consisting of automatically or manually.

6. The harvesting machine as defined in claim 5, wherein said crawler track assembly is automatically moved to the outer final position when said operating device receives a sensor signal indicating that a final position of said lifting device is reached.

7. The harvesting machine as defined in claim 5, wherein said crawler track assembly is moved to the outer final position when an operator detects that a final position of said lifting device is reached and provides a manual input to said operating device indicative of same.

* * * * *